US012568082B2

(12) United States Patent
Ward et al.

(10) Patent No.: US 12,568,082 B2
(45) Date of Patent: Mar. 3, 2026

(54) MULTIPLE BIOMETRIC DATA AUTHENTICATION

(71) Applicant: Wells Fargo Bank, N.A., San Francisco, CA (US)

(72) Inventors: Marc R. Ward, Livermore, CA (US); Joseph Michael Korchmar, Concord, NC (US); Joseph Christopher Impinna, Mesa, AZ (US); Nilesh K. Shah, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 188 days.

(21) Appl. No.: 18/538,813

(22) Filed: Dec. 13, 2023

(65) Prior Publication Data

US 2025/0200154 A1 Jun. 19, 2025

(51) Int. Cl.
*H04L 9/40* (2022.01)
*G06F 21/32* (2013.01)

(52) U.S. Cl.
CPC .......... *H04L 63/0861* (2013.01); *G06F 21/32* (2013.01)

(58) Field of Classification Search
CPC ..... H04L 63/08; H04L 63/0861; G06F 21/30; G06F 21/32; G06F 21/40
See application file for complete search history.

(56) References Cited

U.S. PATENT DOCUMENTS

| | | | |
|---|---|---|---|
| 8,401,875 B2 | 3/2013 | Fish et al. | |
| 8,812,319 B2 | 8/2014 | Skerpac | |
| 8,832,800 B2 | 9/2014 | Garcia Perez et al. | |
| 9,710,632 B2 | 7/2017 | Lymberopoulos et al. | |
| 10,992,664 B2 | 4/2021 | Schultz et al. | |
| 11,120,159 B1 * | 9/2021 | Ketharaju | G06F 21/50 |
| 11,188,734 B2 | 11/2021 | Mather et al. | |
| 11,494,046 B2 | 11/2022 | Han et al. | |
| 11,658,959 B2 | 5/2023 | Yang et al. | |
| 2019/0089694 A1 * | 3/2019 | Newton | G06F 21/41 |
| 2020/0175263 A1 * | 6/2020 | Benini | G06V 40/40 |

(Continued)

FOREIGN PATENT DOCUMENTS

WO WO-2014182787 A2 * 11/2014 ............. G06V 40/18

OTHER PUBLICATIONS

Vhaduri, Sudip, "HiAuth: A Hierarchical Implicit Authentication System for IoT Wearables Using Multiple Biometrics", IEEE Access ( vol. 9), pp. 116395-116406, Date of Publication: Aug. 16, 2021, DOI: 10.1109ACCESS.2021.3105481, (Aug. 16, 2021), 12 pages.

*Primary Examiner* — Boris D Grijalva Lobos
(74) *Attorney, Agent, or Firm* — SCHWEGMAN LUNDBERG & WOESSNER, P.A.

(57) ABSTRACT

Systems and techniques may be used for multiple biometric data authentication. An example technique may include receiving first biometric data and second biometric data, optionally combining the first biometric data and the second biometric data into combined biometric data, and comparing the first and second or the combined biometric data to stored biometric reference data associated with an account of a user to generate a similarity score. The example technique may include determining whether the similarity score exceeds a threshold value, and in response to determining that the similarity score exceeds the threshold value, outputting an indication.

19 Claims, 6 Drawing Sheets

(56)　　　　　　References Cited

U.S. PATENT DOCUMENTS

| | | | |
|---|---|---|---|
| 2022/0294626 A1* | 9/2022 | Lazzouni | G06F 21/32 |
| 2022/0414194 A1* | 12/2022 | Jöhnßen | G06F 21/316 |
| 2023/0026952 A1 | 1/2023 | Han et al. | |
| 2023/0112458 A1* | 4/2023 | Wald | G06F 21/32 |
| | | | 726/19 |
| 2023/0377302 A1* | 11/2023 | Haller | G06V 40/19 |
| 2024/0370861 A1* | 11/2024 | Benvenuti | H04L 9/3278 |
| 2025/0124440 A1* | 4/2025 | Krishnamoorthy | |
| | | | G06Q 20/40145 |

* cited by examiner

100

102 — USER DEVICE

106 — MEMORY

108 — PROCESSOR

110 — DISPLAY

USER INTERFACE

112 — FIRST BIOMETRIC CAPTURE COMPONENT

114 — SECOND BIOMETRIC CAPTURE COMPONENT

104 — NETWORK

118

120

116 — OPTIONAL BIOMETRIC CAPTURE DEVICE

MULTIPLE BIOMETRIC DATA AUTHENTICATION

TECHNICAL FIELD

The present disclosure generally relates to the field of biometric authentication and, more specifically, to techniques for enhancing security and accuracy in user authentication by using multiple biometric identifiers for authentication.

BACKGROUND

The field of user identity authentication has undergone significant advancements with the widespread adoption of biometric authentication methods. Biometric authentication offers convenience and enhanced security by leveraging unique physiological or behavioral characteristics for user verification. However, traditional single-biometric systems face inherent limitations, such as susceptibility to false positives and the challenge of providing a balance between security and user experience.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The techniques described herein solve various technical problems such as the limitations associated with traditional single-biometric authentication systems. By combining or using two or more biometric identifiers, such as facial recognition or voice recognition for authentication, security or accuracy may be improved. This multi-biometric approach enhances the robustness of the authentication process by significantly reducing the likelihood of false positives or preventing spoofing attempts. The combined biometric authentication approach, optionally integrated with smart contract functionality, offers a higher level of confidence in verifying a user's identity, making it well-suited for applications in secure environments such as banks, businesses, and the access of sensitive personal accounts.

One technical challenge related to biometric authenticators used to access sensitive information and accounts is the inherent limitation of relying solely on a single biometric identifier for authentication, such as facial recognition. While single biometric methods offer convenience, they are susceptible to certain limitations, such as vulnerability to spoofing or false negatives due to environmental factors such as lighting conditions. A related technical problem arises when such single biometric methods cannot sufficiently guarantee the security and accuracy of access control. For example, facial recognition alone may struggle to distinguish between identical twins or may be prone to spoofing attempts using photographs or 3D models.

To address these challenges, the systems and techniques provide an approach combining two biometric identifiers. Using two or more biometric identifiers enhances the accuracy and security of user authentication, particularly when highly insecure environments or interactions occur.

Figure 1:
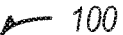
FIG. 1 illustrates a system for multiple biometric data authentication, according to various examples.

FIG. 1 illustrates a system 100 for multiple biometric data authentication, according to various examples. The system 100 includes a user device 102 including one or more components for multi-biometric data authentication. The user device 102 includes memory 106 for storing data and instructions, a processor 108, and a display 110. The display may be used to present a user interface, such as a graphical user interface (GUI). The GUI may be used to present one or more selectable options, information, or the like.

The user device 102 may include a first biometric capture component 112 and a second biometric capture component 114 for capturing biometric data. An optional biometric capture device 116 may be connected to the user device 102. In some examples the user device 102 includes two or more biometric capture components (e.g., 112 and 114), in other examples the user device 102 may include one biometric capture component or none. A peripheral biometric capture component (e.g., the optional biometric capture device 116) may be communicatively coupled to the user device 102. In an example, when capturing biometric data, a single biometric capture component (e.g., 112) may be used to capture two or more sets of biometric data (e.g., a first fingerprint and a second fingerprint). In other examples, two or more biometric capture components (whether a part of the user device 102 or separate, in any combination) may be used to capture two or more biometric data sets (e.g., a fingerprint and iris data). In some examples, two or more biometric capture components may be used to capture a single set of biometric data (e.g., a microphone and a camera may be used to capture biometric video data).

The system 100 may include a server 118 or a database 120. The server 118 or the database 120 may be a single device, may include multiple devices, may be located in different or same locations, etc. The user device 102 may communicate with the server 118 or the database 120 via a network 104 (e.g., the internet). The server 118 or the database 120 may store authentication information. The server 118 may implement secure authentication techniques, such as verifying biometric information (e.g., comparing biometric data received from the user device 102 via the network 104 to stored biometric data from the database 120). During the authentication process, the stored biometric data, which may be located in long-term memory, is retrieved from the database 120. In some examples, the user device 102 may interact with the server 118 and the database 120 via the network 104, (e.g., the internet), although other communication channels may be employed depending on the specific environment. Through the network 104, the user device 102 can securely transmit biometric data to the server 118 and receive an authentication response. The server 118 may perform additional processing by combining or splitting the biometric data received from the user device 102.

Figure 2:
FIG. 2 illustrates an example user device for displaying an authentication prompt or user account information, according to various examples.
Figure 2:
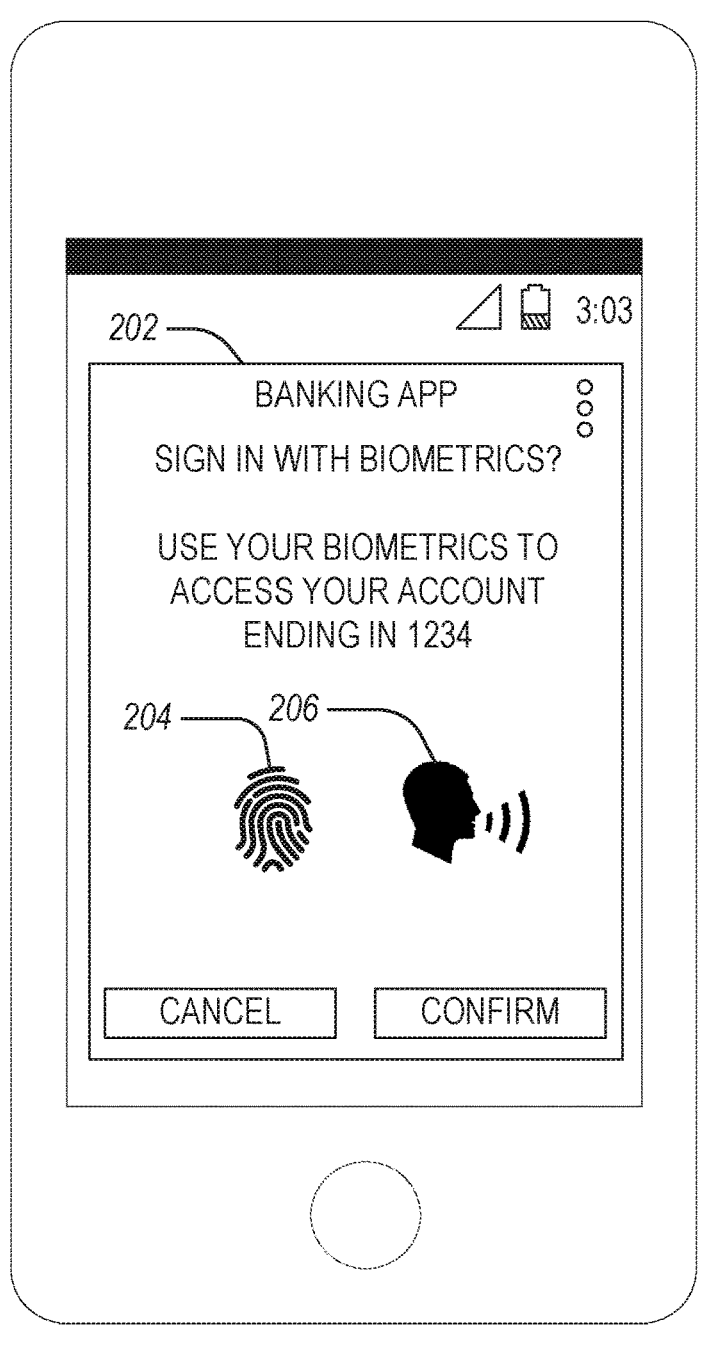

FIG. 2 illustrates an example user device 200 for displaying an authentication prompt or user account information, according to various examples. A GUI may be presented on the user device 200, which, in the example of FIG. 2, depicts a banking application 202. In an example, the user device 200 may include a mobile device, such as a smartphone, a tablet, a laptop, or other computing device (e.g., a desktop computer). The user device 200 may include one or more applications, such as the banking application 202. To ensure data security and user privacy, the user device 200 may require user permissions for granting access to specific data or to activate a sensor, such as for location information, microphone access, etc.

The banking application 202 may present an authentication prompt for a user to be authenticated using biometrics. In an example, two or more biometrics may be used or required for authentication. In FIG. 2, and only for illustrative purposes, a first biometric is represented as a fingerprint icon 204, and a second biometric is represented as a microphone icon 206. In other examples, different biometrics, combinations of biometrics, order of biometrics, etc. may be used. For example, biometrics related to video capture, gesture, iris, face, or the like may be used. In some examples, a combination of two of a same type of biometric may be used, such as two fingerprints of different fingers (e.g., a thumb and a pointer finger). When using or requiring two or more biometric inputs to authenticate a user, the biometrics may be of the user or may be of another user (or a combination). For example, a child may be authenticated using the child's fingerprint and a guardian or trusted account holder's fingerprint. The order in which the biometric data is collected may vary based on user security preferences. For example, a user may be authenticated using a facial scan first, and then proceed with a voiceprint that may be separately or jointly evaluated for authentication. The user security preferences may relate to a degree of user preference for secure authentication, such as always authenticating with maximum security, speed of biometric capture, etc. In some examples, the user security preferences may be based on likelihood of biometric data being compromised (e.g., in response to a lost device that had a fingerprint login, avoiding using fingerprint biometrics).

In some examples, a plurality of selectable biometric icons may be displayed, enabling a user to choose one or more preferred biometric identifiers from a list of stored biometric identifiers for secure account access. The selectable biometric icons may be presented to the user within a user interface. In some examples, the selectable biometric icons may be determined based on stored biometric identifiers, such as previously used biometric data, selected biometric data, previously configured biometric data capture selections, or the like. The icons may used as visual representations of various biometric identifiers that may be used for secure account access. The icons may include representations for one or more of fingerprints, facial recognition, voiceprints, iris scans, palm prints, gait, or the like.

Two or more biometric inputs may be used or required to access an account. For example, a user may select an option to use two or more biometric inputs. In another example, a system administrator may require two or more biometric inputs. The specific biometric inputs used may be selected by a user (e.g., during setup or during a login attempt) or may be specified by a system administrator. In some examples, one or more of the biometric inputs may change from one login attempt to a next (e.g., they may be rotated, they may be arbitrarily selected each login attempt, a user may select different inputs, etc.).

When two or more biometric inputs are selected or required for authentication, the user device 202 may be used to capture or receive biometric input. In some examples, the user device may capture two or more biometric inputs at the same time (e.g., during a time period), such as capturing audio with a microphone and an image or video with a camera. In other examples, sequential biometric data may be captured (e.g., a fingerprint then an iris scan). The biometric data captured, whether simultaneously or sequentially, may be stored at the user device 200 or sent to a server. The biometric data captured may be stored or sent in a combined data structure or in separate data structures. For example, audio and video may be combined into a single data file or two captured biometric inputs may be stored in separate data files. The process of combining or separating biometric data can be adapted based on user preferences. When combining data, the user device 202 may merge multiple biometric inputs into a single data structure or file. For example, the user device 202 may capture biometric data, such as audio and video data, sequentially, with each biometric being recorded one after the other. The audio and video data may be combined into a composite file that includes both types of biometric data to be sent to a server for further processing. In other examples, each biometric input may be stored in a separate file. For example, when two fingerprints are captured, they may be stored as separate files and individual biometric data may be independently processed or authenticated.

Figure 3A:
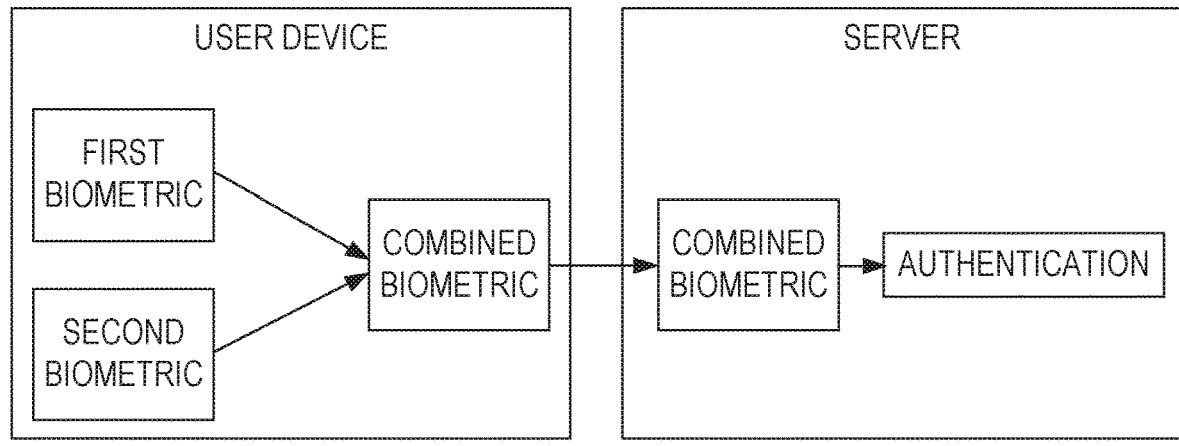
FIGS. 3A-3C illustrate example data flow diagrams for combined biometric data authentication, according to various examples.
Figure 3B:
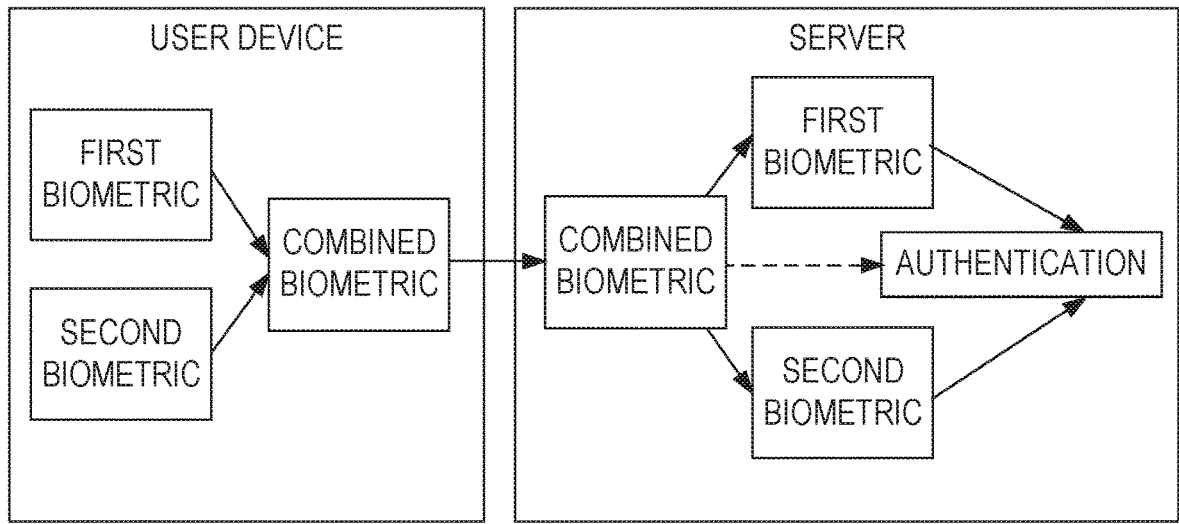
Figure 3C:
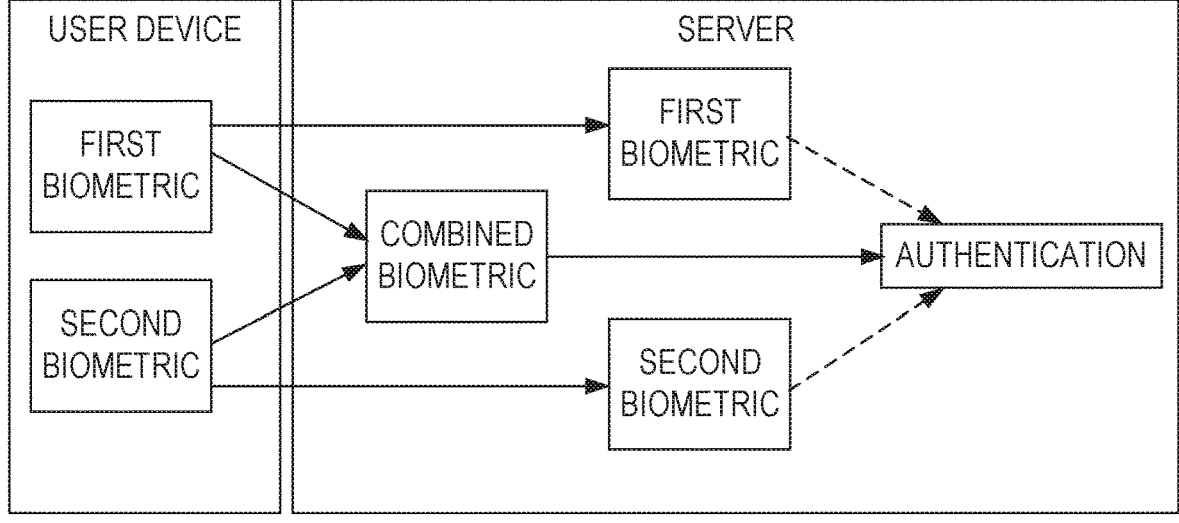

FIGS. 3A-3C illustrate example data flow diagrams for combined biometric data authentication, according to various examples.

FIG. 3A illustrates a first example of an authentication process. This example illustrates a scenario where the combination of biometric identifiers occurs at the user device before transmission. The authentication process may be initiated by a user device capturing or receiving a first biometric input and a second biometric input. These biometric inputs may be combined at the user device, creating a unified set of combined biometric data. The unified set of combined biometric data may be transmitted securely to a server for further processing and authentication.

FIG. 3B illustrates an example where a combination of biometrics is split at a server after transmission from a user device. In FIG. 3B, a user device captures or receives first and second biometric inputs. For example, the first or second biometric inputs may be generated by a component of the user device, received from a biometric device external to the user device, captured sequentially, simultaneously, or a combination thereof. The individual biometric inputs are combined at the user device before being transmitted to a server. At the server, the combined biometric inputs may be split back into first and second biometric data. The split first and second biometric data may be authenticated separately in some examples. The combined biometric data may be optionally authenticated along with or instead of the first and second biometric data. In some examples, one of the first or second biometric data may be authenticated with the combined biometric data.

FIG. 3C illustrates an example where a combination of biometrics is generated at a server based on data received from a user device. In this example, the user device captures or receives first and second biometric inputs. The individual biometric inputs are transmitted separately to the server. At the server, the received biometric data may be combined, creating a unified set of combined biometric data. Any one or more of (or any combination of) the first biometric input, the second biometric input, or the combined biometric data may be used to authenticate a user.

In some examples, a portion of a received biometric input may be used to authenticate a user. For example, the portion may include one or more frames of a video, a snippet of audio, etc. A portion of received biometric data may be used to authenticate a user in examples where a full data capture is not necessary or selected for the authentication process. The selection of the portion to be used for authentication may be based on various factors, including available computational resources, network bandwidth constraints, user security preferences, capture quality, authentication level of risk, capture capabilities (e.g., physical sensor capabilities), or the like. For example, in a mobile device application where network connectivity may be limited, only a subset of biometric data may be captured or transmitted for authentication. A user may select an option to customize authentication preferences to specify biometric data elements from a captured input to be used for authentication, or the selection may be made automatically (e.g., according to security protocols of an enterprise).

Biometric data may be authenticated by comparing the biometric data to stored biometric data, for example within a threshold match. When a combined set of biometric data is used, a comparison may be made based on a combined threshold. The captured biometric data may be compared to stored biometric reference data associated with an account of the user. To successfully authenticate the user, the combined set of biometric data may be required to meet a minimum similarity threshold compared to the stored reference data. For example, when facial recognition and voice recognition are used for authentication, an evaluation may be made as to how closely the combined biometric data matches the stored reference data for of a combination of both facial and voice biometrics. The threshold may be adjusted based on user security preferences or enterprise requirements. An adaptive technique may also be used to dynamically adjust a similarity thresholds over time to respond to changing user patterns, biometric data, changes in enterprise requirements, unauthorized attempts, or the like. User preferences may be based on a specific user device in use. For example, an authentication preference may be indicated by a combination of facial recognition and fingerprint scanning while using a mobile device, and an authentication preference may include facial recognition paired with voiceprint scanning when using a desktop device. In this example, the device-specific preferences may be used for suggesting future authentication options or may be used as a default.

Figure 4:
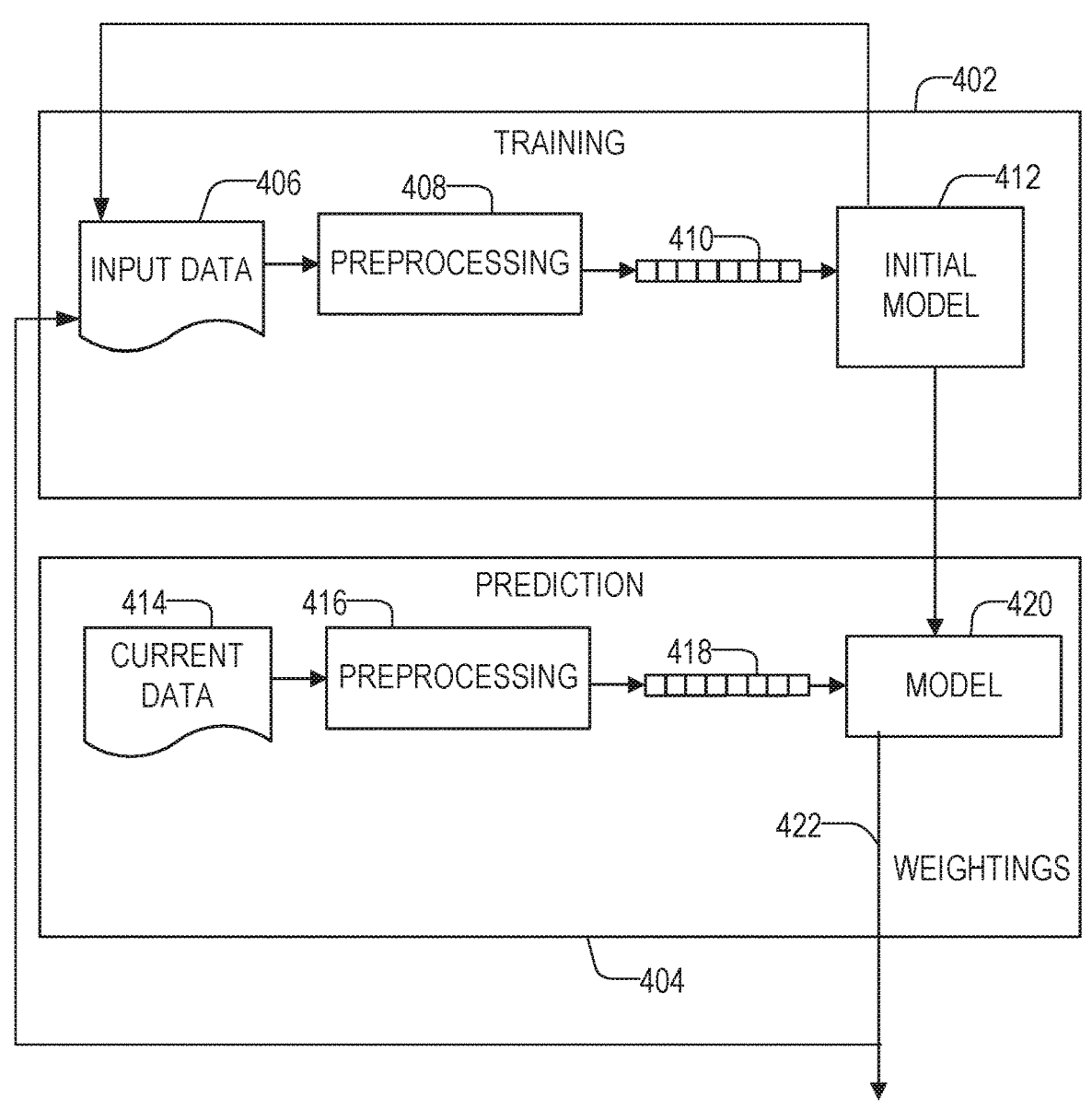
FIG. 4 illustrates a machine learning engine for training and execution related to a biometric authentication, according to various examples.

FIG. 4 illustrates a machine learning engine for training and execution related to a biometric authentication, according to various examples. The machine learning engine may be deployed to execute at a mobile device (e.g., a cell phone) or a computer (e.g., an orchestrator server). A system may calculate one or more weightings for criteria based upon one or more machine learning algorithms. FIG. 4 shows an example machine learning engine 400 according to some examples of the present disclosure.

Machine learning engine 400 uses a training engine 402 and a prediction engine 404. Training engine 402 uses input data 406, for example after undergoing preprocessing component 408, to determine one or more features 410. The one or more features 410 may be used to generate an initial model 412, which may be updated iteratively or with future labeled or unlabeled data (e.g., during reinforcement learning), for example to improve the performance of the prediction engine 404 or the initial model 412. An improved model may be redeployed for use.

The input data 406 may include a variety of biometric identifiers, such as facial recognition data, voice prints, fingerprint scans, behavioral biometrics such as typing patterns, gait, or the like. Contextual information, such as a current location of a user device may be included as input data. User-specific information, such as historical authentication patterns, preferred biometric identifiers, or past behavior may be used, for example as a side input to influence weighting in the initial model 412. For example, when a user consistently prefers a combination of facial recognition authentication with a voiceprint, this combination may be weighted more heavily.

In the prediction engine 404, current data 414 (e.g., information received in an authentication attempt, such as via an API, which may include biometric data, etc.) may be input to preprocessing component 416. In some examples, preprocessing component 416 and preprocessing component 408 are the same. The prediction engine 404 produces feature vector 418 from the preprocessed current data, which is input into the model 420 to generate one or more criteria weightings 422. The criteria weightings 422 may be used to output a prediction, as discussed further below.

The training engine 402 may operate in an offline manner to train the model 420 (e.g., on a server). The prediction engine 404 may be designed to operate in an online manner (e.g., in real-time, at a mobile device, on a wearable device, etc.). In some examples, the model 420 may be periodically updated via additional training (e.g., via updated input data 406 or based on labeled or unlabeled data output in the weightings 422) or based on identified future data, such as by using reinforcement learning to personalize a general model (e.g., the initial model 412) to a particular user.

Labels for the input data 406 may include one or more categories and attributes associated with biometric data. For example, a label may specify that a particular facial recognition data point corresponds to a successful user authentication, or it may indicate a location of a device when capturing the biometric data. The label may include historical user authentication data, including past authentication attempts, successful or unsuccessful, for the corresponding biometric data. The label may include a recurring or repeating pattern associated with successful or unsuccessful user authentication attempts over a period of time. For example, when a user typically fails a first login attempt but usually succeeds in a second attempt, the first attempt may be disregarded, given less weight, or labeled as unlikely to be a malicious attempt when training the initial model 412.

The initial model 412 may be updated using further input data 406 until a satisfactory model 420 is generated. The model 420 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 402 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 402. In an example embodiment, a regression model is used and the model 420 is a vector of coefficients corresponding to a learned importance for each of the features in the vector of features 410, 418. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 420 may output a prediction associated with incoming biometric data. The prediction may include whether the biometric data matches (e.g., within a threshold) stored biometric data. The prediction may indicate whether an authentication attempt is authorized, incorrect, or malicious, in some examples. The model 420 may be retrained over time, in some examples.

Figure 5:
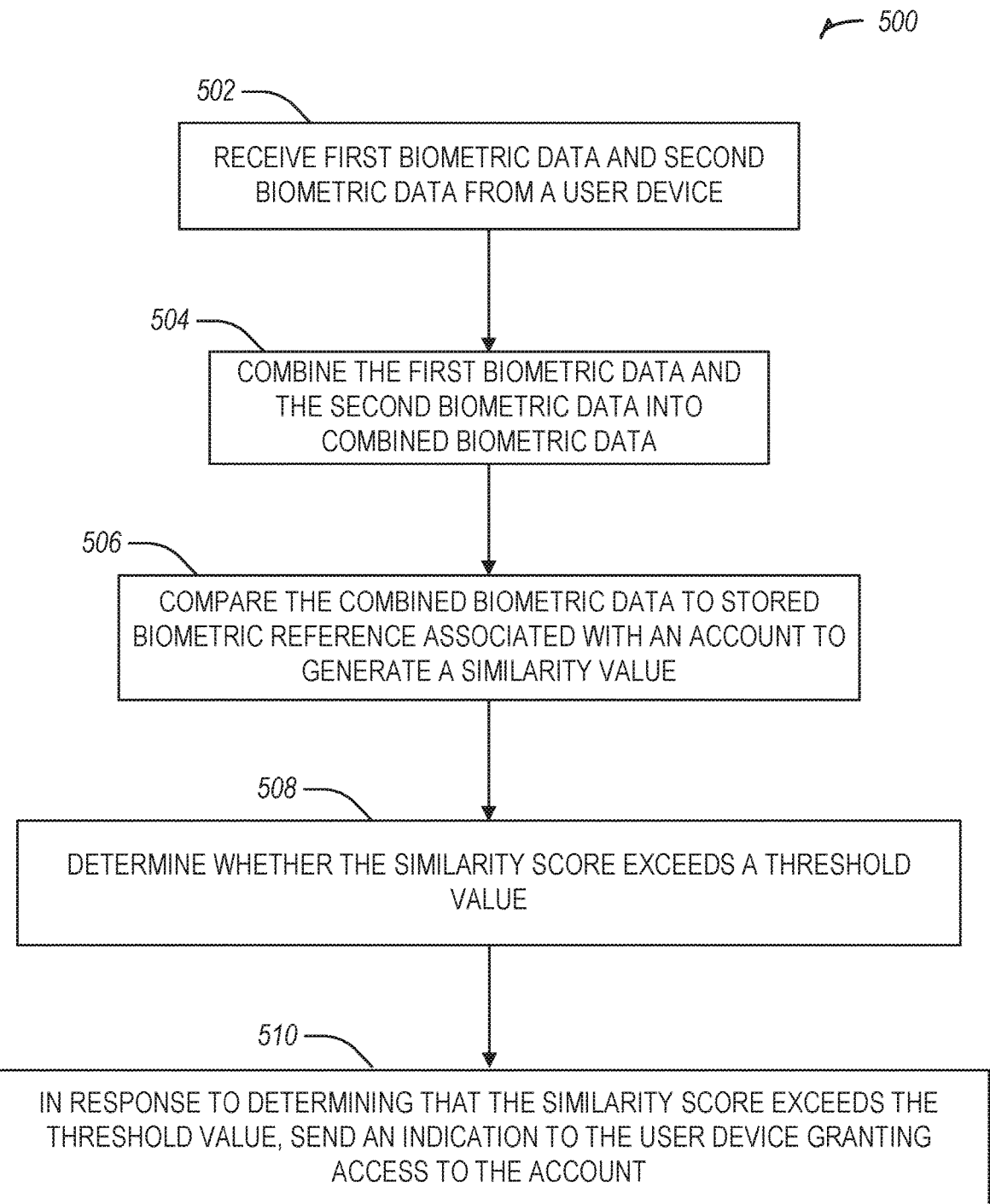
FIG. 5 illustrates a flowchart showing a technique for multi-biometric data authentication, according to various examples.

FIG. 5 illustrates a flowchart showing a technique 500 for multi-biometric data authentication, according to various examples.

The technique 500 includes an operation 502 to receive first biometric data and second biometric data from a user device. These biometric data points may include, for example, a fingerprint, a voice print, an iris scan, facial recognition, a typing pattern, a gait, or other aspect that represents a distinct physiological characteristic of a user. In some examples, the biometric data points may include context-specific data including a current location of a user device or a device-specific attribute.

The technique 500 includes an operation 504 to combine the first biometric data and the second biometric data into combined biometric data. The combined biometric data may be prepared for further analysis or comparison with stored biometric reference data.

The technique 500 includes an operation 506 to compare the combined biometric data to stored biometric reference data associated with an account, for example, to generate a similarity value. The similarity score may include a quantification of a degree of similarity between the combined biometric data and the stored reference data. The similarity score may be calculated based on an identified reliability of the first biometric data and the second biometric data.

The technique 500 includes an operation 508 to determine whether the similarity score exceeds a threshold value. The threshold value may be used as a decision criterion. In an example, when the comparison result traverses the threshold, the authentication may be deemed successful. The threshold value may be selected (e.g., based on an optimization minimizing false negatives or false positives) or set based on a user preference. The threshold value may be configured based on security preferences.

The technique 500 includes an operation 510, in response to determining that the similarity score exceeds the threshold value, to send an indication to the user device granting access to the account. The indication represents a successful authentication, providing the user with secure access to the specified account, application, or resource. Operation 510 may include executing a smart contract in response to the determination that the similarity score exceeds the threshold value.

The technique 500 may include splitting the first and second biometric data, and comparing each of the split first and second biometric data to respective stored biometric reference data. In an example, the technique 500 includes receiving the first and second biometric data, and comparing each of the first and second biometric data to respective stored biometric reference data.

Figure 6:
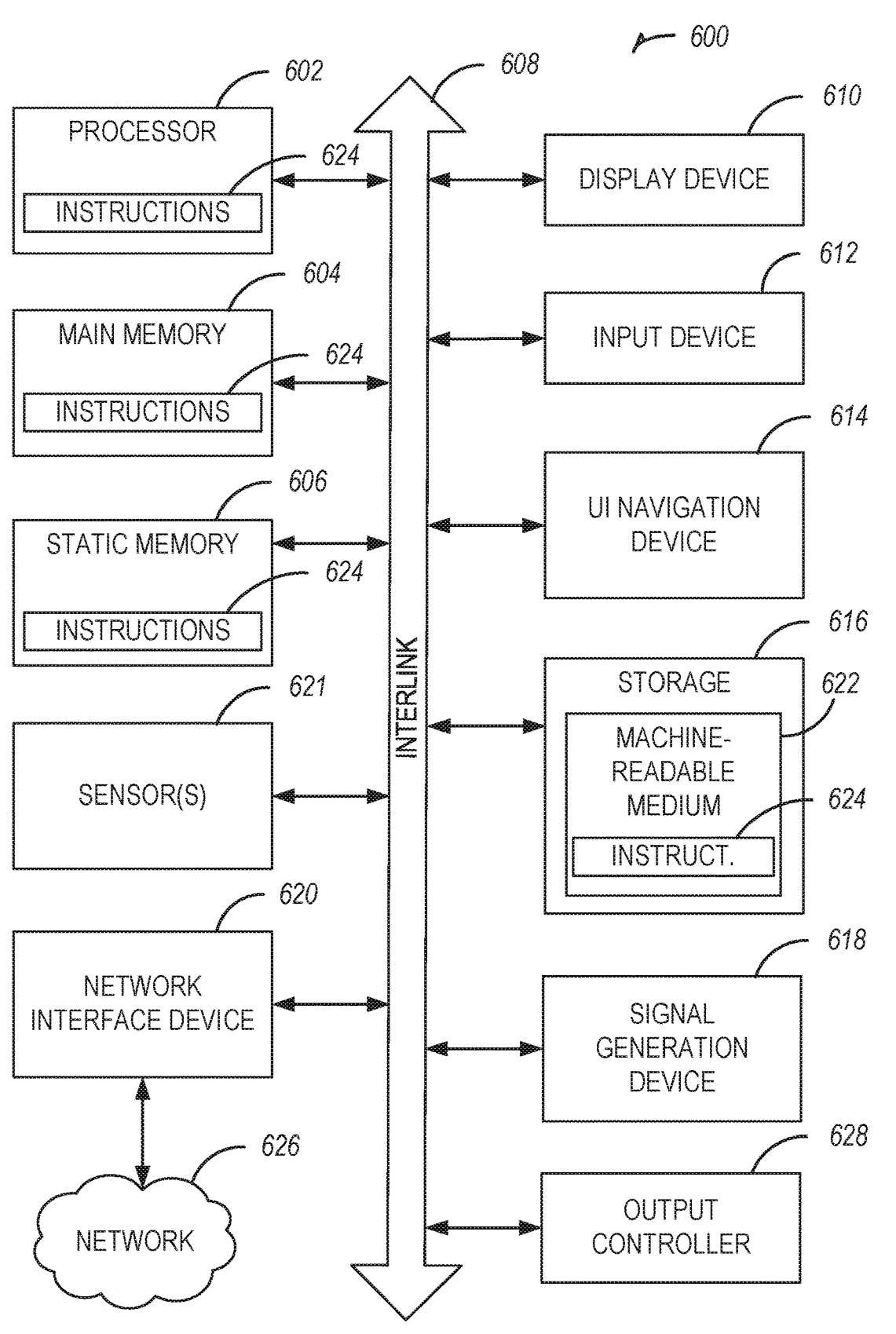
FIG. 6 illustrates generally an example of a block diagram of a machine upon which any one or more of the techniques discussed herein may perform, according to various examples.

FIG. 6 illustrates generally an example of a block diagram of a machine 600 upon which any one or more of the techniques (e.g., methodologies) discussed herein may perform in accordance with some examples. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: receiving, at a server from a user device, first biometric data and second biometric data; combining the first biometric data and the second biometric data into combined biometric data; comparing, at the server, the combined biometric data to stored biometric reference data associated with an account of a user to generate a similarity score; determining whether the similarity score exceeds a threshold value; and in response to determining that the similarity score exceeds the threshold value, sending an indication to the user device granting access to the account.

In Example 2, the subject matter of Example 1 includes, splitting the first and second biometric data, and comparing each of the split first and second biometric data to respective stored biometric reference data.

In Example 3, the subject matter of Examples 1-2 includes, receiving the first and second biometric data, and comparing each of the first and second biometric data to respective stored biometric reference data.

In Example 4, the subject matter of Examples 1-3 includes, wherein a smart contract is executed in response to the determination that the similarity score exceeds the threshold value.

In Example 5, the subject matter of Examples 1-4 includes, wherein the threshold value is configured based on security preferences.

In Example 6, the subject matter of Examples 1-5 includes, wherein the similarity score is calculated based on an identified reliability of the first biometric data and the second biometric data.

In Example 7, the subject matter of Examples 1-6 includes, wherein the first biometric data includes at least one of fingerprint data, face data, voice data, gait data, or typing metadata.

Example 8 is a method comprising: receiving, at a server from a user device, combined biometric data, the combined biometric data captured at the user device via two or more biometric data sources; comparing, at the server, the combined biometric data to stored biometric reference data associated with an account of a user to generate a similarity score; determining whether the similarity score exceeds a threshold value; and in response to determining that the similarity score exceeds the threshold value, sending an indication to the user device granting access to the account.

In Example 9, the subject matter of Example 8 includes, wherein a smart contract is executed in response to the determination that the similarity score exceeds the threshold value.

In Example 10, the subject matter of Examples 8-9 includes, wherein the threshold value is configured based on security preferences.

In Example 11, the subject matter of Examples 8-10 includes, wherein the biometric data includes at least one of fingerprint data, face data, voice data, gait data, or typing metadata.

In Example 12, the subject matter of Examples 8-11 includes, extracting, from the combined biometric data, first biometric data and second biometric data corresponding to the two or more biometric data sources, and comparing the first biometric data and the second biometric data to the stored biometric reference data to generate two additional similarity scores, and wherein sending the indication to the user device granting access to the account occurs in response to determining that the two additional similarity scores exceed corresponding threshold values.

In Example 13, the subject matter of Examples 8-12 includes, wherein the combined biometric data was captured at the user device via two or more biometric data sources separately, and combined at the user device.

In Example 14, the subject matter of Examples 8-13 includes, wherein the combined biometric data was captured at the user device via two or more biometric data sources in a single channel.

In Example 15, the subject matter of Example 14 includes, wherein the single channel is video or audio and wherein the two or more biometric data sources include two or more faces, two or more voices, or at least one face and at least one voice.

Example 16 is a machine-readable medium storing instructions that, when executed by processing circuitry of a server, cause the processing circuitry to perform operations to: receive, from a user device, first biometric data and second biometric data; combine the first biometric data and the second biometric data into combined biometric data; compare the combined biometric data to stored biometric reference data associated with an account of a user to generate a similarity score; determine whether the similarity score exceeds a threshold value; and in response to determining that the similarity score exceeds the threshold value, send an indication to the user device granting access to the account.

In Example 17, the subject matter of Example 16 includes, wherein the operations further comprise: providing a graphical user interface (GUI) on the user device for capturing and receiving the first biometric data and the second biometric data.

In Example 18, the subject matter of Examples 16-17 includes, wherein the operations further comprise: enabling the user to configure the stored threshold value.

In Example 19, the subject matter of Examples 16-18 includes, wherein the operations further comprise: transmitting an access denial indication to the user device when the similarity score does not exceed the threshold value.

In Example 20, the subject matter of Examples 16-19 includes, wherein the operations further comprise: executing a smart contract granting the user account access in response to the determination that the similarity score exceeds the threshold value.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   receiving, at a server from a user device, first biometric data and second biometric data;
   combining the first biometric data and the second biometric data into combined biometric data;
   comparing, at the server, the combined biometric data to stored biometric reference data associated with an account of a user to generate a similarity score;
   splitting the first and second biometric data;
   comparing each of the split first and second biometric data to respective stored biometric reference data;
   determining whether the similarity score exceeds a threshold value; and
   in response to determining that the similarity score exceeds the threshold value, sending an indication to the user device granting access to the account.

2. The method of claim 1, further comprising receiving the first and second biometric data, and comparing each of the first and second biometric data to respective stored biometric reference data.

3. The method of claim 1, wherein a smart contract is executed in response to the determination that the similarity score exceeds the threshold value.

4. The method of claim 1, wherein the threshold value is configured based on security preferences.

5. The method of claim 1, wherein the similarity score is calculated based on an identified reliability of the first biometric data and the second biometric data.

6. The method of claim 1, wherein the first biometric data includes at least one of fingerprint data, face data, voice data, gait data, or typing metadata.

7. A method comprising:
   receiving, at a server from a user device, combined biometric data, the combined biometric data captured at the user device via two or more biometric data sources;
   comparing, at the server, the combined biometric data to stored biometric reference data associated with an account of a user to generate a similarity score;
   splitting the combined biometric data to generate first and second biometric data;
   comparing each of the split first and second biometric data to respective stored biometric reference data;
   determining whether the similarity score exceeds a threshold value; and
   in response to determining that the similarity score exceeds the threshold value, sending an indication to the user device granting access to the account.

8. The method of claim 7, wherein a smart contract is executed in response to the determination that the similarity score exceeds the threshold value.

9. The method of claim 7, wherein the threshold value is configured based on security preferences.

10. The method of claim 7, wherein the biometric data includes at least one of fingerprint data, face data, voice data, gait data, or typing metadata.

11. The method of claim 7, wherein comparing each of the split first and second biometric data includes generating two additional similarity scores, and wherein sending the indication to the user device granting access to the account occurs in response to determining that the two additional similarity scores exceed corresponding threshold values.

12. The method of claim 7, wherein the combined biometric data was captured at the user device via two or more biometric data sources separately, and combined at the user device.

13. The method of claim 7, wherein the combined biometric data was captured at the user device via two or more biometric data sources in a single channel.

14. The method of claim 13, wherein the single channel is video or audio and wherein the two or more biometric data sources include two or more faces, two or more voices, or at least one face and at least one voice.

15. A machine-readable medium storing instructions that, when executed by processing circuitry of a server, cause the processing circuitry to perform operations to:

receive, from a user device, first biometric data and second biometric data;

combine the first biometric data and the second biometric data into combined biometric data;

compare the combined biometric data to stored biometric reference data associated with an account of a user to generate a similarity score;

split the first and second biometric data;

compare each of the split first and second biometric data to respective stored biometric reference data;

determine whether the similarity score exceeds a threshold value; and in response to determining that the similarity score exceeds the threshold value, send an indication to the user device granting access to the account.

16. The machine-readable medium storing instructions of claim 15, wherein the operations further comprise:

providing a graphical user interface (GUI) on the user device for capturing and receiving the first biometric data and the second biometric data.

17. The machine-readable medium storing instructions of claim 15, wherein the operations further comprise:

enabling the user to configure the stored threshold value.

18. The machine-readable medium storing instructions of claim 15, wherein the operations further comprise:

transmitting an access denial indication to the user device when the similarity score does not exceed the threshold value.

19. The machine-readable medium storing instructions of claim 15, wherein the operations further comprise:

executing a smart contract granting the user account access in response to the determination that the similarity score exceeds the threshold value.

* * * * *